United States Patent [19]

Kakimoto et al.

[11] Patent Number: 5,332,769

[45] Date of Patent: Jul. 26, 1994

[54] ELECTRON RADIATION CURING TYPE ADHESIVE AND POLYESTER FILM LAMINATED METAL PLATE THEREOF

[75] Inventors: Michiyuki Kakimoto; Ryuichi Eguchi; Atsushi Kobayashi, all of Shimizu; Tadashi Nishimoto, Hiratsuka; Shozo Iseki, Hiratsuka; Tsutomu Maruyama, Hiratsuka, all of Japan

[73] Assignees: Daiwa Can Company, Tokyo; Kansai Paint Co., Ltd., Hyogo, both of Japan

[21] Appl. No.: 2,767

[22] Filed: Jan. 14, 1993

[30] Foreign Application Priority Data

Jan. 31, 1992 [JP] Japan .................................. 4-059845

[51] Int. Cl.$^5$ .......................... C08K 3/00; C08K 3/34; C08K 3/20
[52] U.S. Cl. .................................... 523/513; 428/457; 523/500; 523/514; 524/492; 524/494
[58] Field of Search ....................... 523/513, 500, 514; 524/492, 494; 428/457

[56] References Cited

U.S. PATENT DOCUMENTS 4,588,419  5/1986  Caul et al. .............................. 51/295
4,927,431  5/1990  Buchanan et al. ..................... 51/298

Primary Examiner—John Kight, III
Assistant Examiner—Terressa M. Mosley
Attorney, Agent, or Firm—Beveridge, DeGrandi, Weilacher & Young

[57] ABSTRACT

An electron radiation curing type adhesive which is excellent for adhesion between a polyester film and a metal material, and which is excellent in retort resistance or the like where the adhesive is used for food cans. There is also disclosed a metal plate laminated with a polyester film. The electron radiation curing type adhesive is composed of a resin composition in which 2 to 200 weight part of polyester group oligomer having unsaturated double-bonds, with respect to 100 weight parts of polyester resin, has added thereto 0.5 to 250 PHR of a stress relaxation agent. The polyester film and a metal plate are laminated with each other by means of the above-mentioned adhesive, and then the film and the metal plate are bonded together by heating and curing the adhesive by irradiation using electron radiation.

9 Claims, No Drawings

ELECTRON RADIATION CURING TYPE ADHESIVE AND POLYESTER FILM LAMINATED METAL PLATE THEREOF

BACKGROUND OF THE INVENTION

The present invention relates to an electron radiation curing type adhesive, and to a polyester film laminated metal plate for cans, using this adhesive.

Heretofore, a polyester film laminated metal plate (which will be hereinbelow denoted as "PET laminated metal plate") used for cans to hold beverages or foods is usually manufactured by laminating a metal plate or cover with a polyester film through the intermediary of an adhesive (as disclosed in, for example, Japanese Laid-Open Patent No. 3-87249).

A conventional method of manufacturing a PET laminated metal plate comprises the steps of: (1) applying an adhesive to a polyester film (which will be hereinbelow denoted as "PET film"), and drying the same until it becomes tack-free (usually at about 50 to 150 deg. C. for several seconds); (2) heating the PET film applied with the adhesive and the metal plate (usually at about 180 deg. C., for 0.5 sec) so as to laminate them together; and (3) after-baking the adhesive (usually at about 180 deg. C. for 60 to 100 sec) which is therefore completely cured.

The above-mentioned conventional manufacturing method has raised the following problems:

(1) an after-baking furnace has to be relatively long in order to satisfy conditions for producing a PET laminated metal plate in a short time through high speed production lines which have become recently required;

(2) in the conventional manufacturing method, insufficiently bonded parts (insufficiently cured parts) are found in the case of laminating speeds of higher than 150 m/min or in the case of temperatures of less than 180 deg. C., that is, unevenness occurs in the external appearance of the product; and (3) cans for beverages or foods made of a PET laminated metal plate manufactured by conventional methods are inferior in processability (for necking, flanging, beading or the like), whitening or blistering occurs on a parting line which is formed along the barrel of a can in the vicinity of the weld, being caused by welding heat or by baking a side seam paint (at maximum ultimate temperatures of 230 to 240 deg. C. at 90 sec or 240 to 280 deg. C. at 7 to 20 sec) after a retort process, a water spot-like pattern is found on the surface of the PET film, or the surface finish such as luster deteriorates.

SUMMARY OF THE INVENTION

In view of the above-mentioned problems, one object of the present invention is to provide a PET laminated metal plate to which lamination can be made at high speed and at a low temperature without the necessity of large facilities and a large space, which has excellent adhesion between the PET film and the metal plate. This is accomplished by curing the adhesive with the use of electron radiation whereby the product surpasses conventional products in properties such as processability and retort resistance, or in surface finish when it is used for cans. Further, another object of the present invention is to provide an electron radiation curing type adhesive which can give excellent effects in the above-mentioned use.

It is a feature of the invention to provide an electron radiation curing type adhesive characterized in that 0.5 to 250 PHR of a stress relaxation agent is added to a resin composition having 0.3 to 5.0 mol/kg molecular weight of polymeric unsaturated double-bonds, with respect to 100 weight parts of a polyester resin having a number-average molecular weight of 7,000 to 40,000, and blended with 2 to 200 weight parts of polyester group oligomer having a number-average molecular weight of 300 to 5,000.

Another feature of the invention resides in a polyester film laminated metal plate for cans, characterized in that a polyester film is laminated over at least one surface of a metal plate by means of an electron radiation curing type adhesive in which 0.5 to 250 PHR of a stress relaxation agent is added to a resin composition having 0.3 to 5.0 mol/kg molecular weight of polymeric unsaturated double-bond, with respect to 100 weight parts of polyester resin having a number-average molecular weight of 7,000 to 40,000, and blended with 2 to 200 weight parts of polyester group oligomer having a number-average molecular weight of 300 to 5,000, and electron radiation is irradiated to said adhesive through said polyester film so as to cure the adhesive.

PREFERRED EMBODIMENTS OF THE INVENTION

The present invention will be specifically explained hereinbelow.

The coventional PET metal plate requires heating for evaporating a solvent until the applied adhesive becomes tack-free at the above-mentioned step (1), and also requires heating for softening the PET film and bringing the adhesive into close contact therewith at step (2). Further it requires baking for completing the curing reaction of the adhesive in order to enhance the retort resistance or the like. Accordingly, the uses of heating means is not always required. The inventors, therefore, found that the curing reaction can be made in a short time (several seconds) by use of a specific electron radiation curing type adhesive so as to provide a PET laminated metal plate which is excellent in properties such as adhesion and retort resistance, and that the PET film itself is reformed since the electron radiation is irradiated through the PET film during curing of the adhesive. Accordingly, the above-mentioned disadvantages can be solved, whereby it is possible to obtain a surface finish having satisfactory luster.

The electron radiation type adhesive according to the present invention, can be obtained by adding 0.5 to 250 PHR of a stress relaxation agent to a resin composition having 0.3 to 5.0 mol/kg molecular weight of polymeric unsaturated double-bonds, with respect to 100 weight parts of polyester resin, and blended with 2 to 200 weight parts of polyester group oligomer (which will be hereinbelow denoted sometime as "oligomer") having a number average of 300 to 5,000.

In order to achieve the objects of the present invention, first of all it is required for the polyester resin component to be adhesive since it bonds metal with a PET film. Further, it must have flexibility during processing of a product. Further, water-resistance, weather-resistance, chemical resistance, heat-resistance and the like are required so that the adhesive layer on the laminated metal plate will have durability.

The polyester resin used in the present invention is a thermoplastic resin which is a conventionally well-known condensate of a polybasic acid and a polyhydroxy alcohol, having a number-average molecular weight in a range of 7,000 to 40,000, preferably in a range of 10,000 to 30,000.

As the polybasic acid, there can be used aliphatic dibasic acids such as adipic acid, suberic acid, azelaic acid, sebasic acid or decane-1,10-dicarboxylic acid, alicyclic polybasic acids such as hexahydrophthalic acid, hexahydrotrimellitic acid, dimethyl terephthalate, dimethyl isophathalate, tetrahydrophthalate or the anhydride thereof, or aromatic polybasic acids such as phthalic acid, isophthalic acid, terephthalic acid, trimellitic acid, pyromellitic acid or the anhydride thereof, maleic acid, fumaric acid, itaconic acid and the like.

As the polyhydroxy alcohol, there can be used ethylene glycol, propylene glycol, diethylene glycol, 1,2-butylene glycol, 1,6-hexanediol, 1,4-cyclohexanedimethanol, neopentylglycol, polylactonediol and the like.

The manufacture of polyester resins can be carried out by condensing and polymerizing the above-mentioned acid component and alcoholic component in a reaction vessel at a temperature of 200 to 250 deg. C. Such procedures are well known in the art.

The oligomer component used in combination with the polyester resin is a polyester group oligomer of a number-average molecular weight of 300 to 5,000, preferably, 1,000 to 2,000, having 0.3 to 5. mol/kg preferably 1.0 to 3.0 mol/kg molecular weight of polymeric unsaturated double-bonds.

As the polyester group oligomer, there can be used one wherein an acrylic or methacrylic acid is esterlinked to a low molecular weight polyester containing less than 5,000 of number-average molecular weight of hydroxyl groups, and further, the low molecular weight polyester is obtained by condensing the polybasic acid and the polyhydroxy alcohol of the above-mentioned polyester resin component.

If the number-average molecular weight of the above-mentioned polyester resin is equal to or less than 7,000, there is a tendency to lower the corrosion resistance and the water-resistance. If it is equal to or greater than 40,000, a highly solid adhesive cannot be obtained.

Further, if the number-average of the above-mentioned oligomer molecular weight is less than 300, the adhesive layer before heat lamination can hardly become tack-free. If it is greater than 5,000, the hardenability obtained by electron radiation is lowered.

The loadings of the oligomer are 2 to 200 weight parts, preferably 5 to 100 weight parts, more preferably 10 to 50 weight parts, with respect to 100 weight parts of the polyester resin. If the loadings are less than 2 weight parts, the curing reaction of the adhesive by electron radiation is insufficient, and accordingly, the properties such as the retort resistance are lowered. Meanwhile if it is greater than 200 weight parts, the adhesive layer before heat lamination can hardly become tackfree. Further, the thermal stability of the PET laminated metal plate by heat treatment after irradiation of electron radiation becomes inferior.

As the stress relaxation agent blended with the resin composition composed of the above-mentioned polyester resin and oligomer, there can be mentioned silica ($SiO_2 \cdot nH_2O$), bentonite ($Al_2O_3 \cdot 5SiO_2 \cdot 2H_2O$), clay ($Al_2O_3 \cdot 2SiO_2 \cdot 2H_2O$), talc ($3MgO \cdot 4SiO_2 \cdot 2H_2O$), barium sulfate ($BaSO_4$). calcium carbonate ($CaCO_3$) and the like.

The above are all in organic finely devided fillers.

In the case of manufacturing the PET laminated metal plate with the use of an adhesive blended with the above-mentioned stress relaxation agent, the retort resistance can be enhanced in a processed part of the metal plate. The inventors consider that the reason why the retort resistance can be enhanced is that the stress relaxation agent in the adhesive has a role of stress relaxation during processing and formation of the metal plate, and accordingly the adhesive layer can be stably held.

Of the above-mentioned stress relaxation agents, silica having a very small particle size of 0.01 to 0.002 micron exhibits remarkable stress relaxation, and accordingly, is greatly preferable.

The loadings of the stress relaxation agent are in a range of 0.5 to 250 PHR, (weight parts with respect to 100 weight part of resin) preferably 20 to 100 PHR with respect to, as a reference, the resin composition composed of polyester resin and oligomer. If the loadings of the stress relaxation agent is less than 0.5 PHR, the enhancement of the retort resistance of the process part of the PET laminated metal plate cannot be appreciated. However, if it exceeds 250 PHR, the adhesion of the adhesive becomes lower.

Further, the electron radiation curing type adhesive according to the present invention, can be used as an adhesive which also can serve as a coloring coating by being blended with a coloring pigment, such as a whitening group pigment, e.g. titanium oxide, and a well-known chromatic coloring pigment which is used by being mixed with and diffused into the whitening group pigment, as necessary. In the case of using the PET laminated metal plate for the outer surface of a can, it is in general subjected to multi-color printing, and accordingly, a coloring layer (usually white coating) is required to be laid underneath a printing ink layer. However, with the use of the above-mentioned adhesive which can also serve as a coloring pigment, the number of process steps of manufacturing a can be reduced by one, and accordingly, it is very advantageous.

The electron radiation curing type adhesive according to the present invention, can be prepared by mixing the resin component composed of polyester resin and oligomer and the stress relaxation agent as well as, if necessary, a coloring pigment and by diluting the thus obtained mixture with an organic solvent such as methyl ethyl ketone or toluene.

Further, less than 30 wt. % of vinyl group resin such as vinyl chloride resin, vinyl acetate resin, vinyl chloride/vinyl acetate copolymer or a vinlydene chloride resin, or (block) polyisocyanate compound is blended into the resin component of the adhesive so that the retort resistance of the PET laminated metal plate can be also enhanced.

According to the present invention, in the PET film which is laminated with the metal material by means of the electron radiation curing type adhesive 75 to 100% of the ester repetition unit consists of an ethylene phthalate unit. As the ester unit other than ethylene phthalate unit, the ester unit of phthalic acid, isophthalic acid, succic acid, adipic acid or the like can be used. The PET film is in general surface-treated by a corona discharge process or the like in order to enhance the adhesion to the adhesive. The corona discharge process is well known in the art.

Further, according to the present invention, other than the above-mentioned PET film, polyethylene film or polyprophylene film can be also used. Such films are well known in the art.

As the metal plate to be used, there can be used a hot-rolled plate, a cold-rolled plate, a molten zinc and zinc alloy plated steel plate, an electric zinc and zinc alloy plated steel plate, a tin plate, a tin-free steel plate, a chrome plated steel plate, aluminum plated steel plate, a terne plated steel plate, a nickel plated steel plate or one of other several kinds of alloy plated steel plates, stainless steel plate, an aluminum plate, a copper plate, a titanium plate or one of other metal plates, and further, there can be used one of the above-mentioned plate which has been subjected to chemical conversion treatment such as phosphate treatment, chromate treatment, organic chromate treatment, cobalt complex oxide film treatment, nickel substitution plating or the like.

Next, explanation will be made hereinbelow of the method of manufacturing the PET laminated metal plate.

Thus, the PET film having a thickness of 5 to 30 μm is coated with the adhesive having a dried film thickness of 1 to 5 μm with the use of a usual coating means such as roll coater process, a gravure process, a gravure off-set process, a spray process or the like. As necessary, the coating is dried at a temperature of 50 to 150 deg. C. for several seconds until it becomes tack free. Then, the metal material is laminated with the adhesive layer, and then is heated for lamination at a temperature (less than about 230 deg. C.) lower than the thermal softening temperature of the PET film for less than two seconds.

The thus obtained laminated metal plate is irradiated with electron radiation through the PET film. As an accelerator used for the irradiation of electron radiation, an accelerator of Cockcroft type, Cockcroft-Walton type, van de Graff type, resonance transformer type, dynamitron type, linear filament type, area beam type, high frequency type or the like can be used. The energy of electron radiation required for curing and drying the electron radiation curing type adhesive according to the present invention, is suitably in a range of 100 to 300 Kev, preferably 150 to 200 Kev. The exposure thereof is suitably in a range of 0.2 to 15 Mrad. preferably 1 to 5 Mrad. If the exposure is less than 0.2 Mrad, the curing of the adhesive is incomplete, and accordingly, the properties of the adhesive is unsatisfactory. If the exposure exceeds 15 Mrad, the mechanical strength of the PET film is possibly lowered. The irradiation time of the electron radiation is shorter than about 1 sec which is about 1/50 of the time of curing by heat.

The thus obtained PET laminated metal plate is suitably used for cans such as beverage cans, food cans, miscellaneous cans, five gallon cans etc. Further, it is suitable for use as a thermos bottle, or the outer surface of a refrigerator.

The present invention is further illustrated by the following specific embodiments.

MANUFACTURE OF POLYESTER RESIN

MANUFACTURE EXAMPLE 1

18.3 weight parts of dimethyl terephthalate, 11.7 weight parts of dimethyl isophthalate, 11.9 weight parts of ethylene glycol, 20.5 weight parts of neopentyl glycol, 118 mg of dehydrated zinc acetate as a transesterification catalyst, and 246 mg of antimony trioxide were charged into a one liter autoclave, and were heated up to a temperature of 160 to 210 deg. C. in order to perform transesterification. After about 2 hours, at the time of distillation of a stoichiometric quantity of methanol, the transesterification was completed. Then, a small quantity of trimethyl phosphate is added thereto, and the agitation was carried out at a temperature of 200 to 210 deg. C. for 30 min. Then, the temperature was raised up to 220 deg. C., and then 37.6 weight parts of azelaic acid was added. Further esterification reaction was carried out at a temperatures of 220 to 230 deg. C. for 30 min. Then, simultaneously with a temperature rise up to 250 deg. C., the pressure is gradually decreased, and then an excessive quantity of glycol was removed at a temperature of 250 deg. C. under a vacuum of 10 mHg. Further, temperature increase and depressurization were carried out so as to obtain a polyester resin (I) having a number-average molecular weight of 30,000 and an OH value of 6.5.

Then, the above-mentioned resin (I) was diluted in a solvent composed of methyl ketone and cycrohexanone (50/50) so that the nonvolatile content came to 30 wt. %.

MANUFACTURE EXAMPLE 2

Similar to Example 1, a polyester resin (II) solution having following components was synthesized:

| dimethyl terephthalate | 22.2 weight parts |
| dimethyl isophthalate | 32.7 weight parts |
| sebasic acid | 19.0 weight parts |
| ethylene glycol | 10.1 weight parts |
| nepentyl glycol | 26.2 weight parts |

The thus obtained resin (II) has a number-average molecular weight of 25,000.

MANUFACTURE OF POLYESTER GROUP OLIGOMER

MANUFACTURE EXAMPLE 3

1.0 mol of trimethylol propane, 2.0 mol of triethylene glycol, 1.0 mol of 1.6-hexandiol, 3.0 tool of adipic acid and a catalytic quantity of dibutyl tin oxide were blended so as to produce a polyester having a number-average molecular weight of about 850 and a hydroxy value of 200 in a conventionally well-known manufacturing method.

Then, the thus obtained polyester was blended with acrylic acid so as to obtain an equivalent weight of 1.25 of acrylic acid with respect to 1.2 equivalent weight of the hydroxyl group of the polyester, and was then added thereto with 100 ppm of a polymerization inhibitor (hydroquinone) in order to carry out the reaction at a temperature of 80 to 100 deg. C. When the reaction ceased with a invert ratio of about 85 wt. %, the solvent and unreacted acrylic acid were removed by distillation so as to obtain an polyester acrylate oligomer (I) having about 3.0 mol/kg molecular weight of polymeric double-bonds.

MANUFACTURE OF ELECTRON RADIATION CURING TYPE ADHESIVE

REFERENCE EXAMPLE 1 TO 4

REFERENCE EXAMPLE 1

A resin composition composed of 330 weight parts of a solution containing 30 wt. % of polyester resin (I) and having added thereto 20 weight parts of polyester acrylate oligomer (I) had added and diffused these into 80 weight parts of silica (trade name "AEROGIL 300" manufactured by Japan Aerogil Co.) so that a solution containing 30 wt. % of solid matter was prepared with the use of methyl ethyl ketone solvent (Adhesive A).

REFERENCE EXAMPLE 2

A resin composition composed of 330 weight parts of a solution containing 30 wt. % of polyester resin (II) and having added thereto with 60 weight parts of polyester acrylate oligomer (I), had added diffused thereinto 40 weight parts of silica used in the reference example 1 so as to prepare a 30 wt. % solution containing 30 weight part of solid matter with the use of methyl ethyl ketone solvent (Adhesive B).

REFERENCE EXAMPLE 3

330 weight part of a solution containing 30 wt. % of polyester resin (I) had added thereinto 10 weight parts of polyester oligomer (I) and 10 weight part of vinyl chloride resin (trade name "VERR" manufactured by Union Carbide Co.), and then had added and diffused thereinto 100 weight parts of barium sulfate (trade name "BARIFINE" manufactured by Sakai Chemical Co.) so as to prepare a solution containing 30 wt. % of solid matter a methyl ethyl ketone solution (adhesive C).

REFERENCE EXAMPLE 4

With the use of the adhesive a prepared in Reference Example 1, titanium white pigment JR-300 (manufactured by TAYCA Corporation) was diffused in a pigment/binder weigh ratio of 2 so as to obtain an adhesive serving also as a white coating. The solid matter of the coating was adjusted to 45 wt. % (Adhesive D).

REFERENCE EXAMPLE 5

An ester film E 5100 (PET film having a thickness of 12 $\mu$, one surface of which was subjected to a corona discharge process) manufactured by Toyobo Co. was coated, over its corona discharge processed surface, with the adhesive A by a gravure coating process at a thickness of 2 to 4 $\mu m$. Then, it was led through a drying furnace at a temperature of 100 deg. C. for 10 seconds so as to evaporate solvent matter so that it became tack free.

This coated PET film and a Canlite tin plate (manufactured by Nippon Steel Corporation) having a thickness of 0.19 mm were hot-laminated in a condition in which the roll pressure is set to 5.0 kg/cm$^2$ and the roll temperature was set to 180 deg. C. Then, electron radiation was irradiated through the PET film of the thus laminated metal plate at 4 Mrad with an acceleration voltage of 270 KeV and at a radiation current of 50 mA with the use of an electron radiation accelerator so as to cure the adhesive layer in order to obtain a PET laminated metal plate.

With the use of this metal plate, welded cans were formed, and these cans were subjected to first to fourth stages of necking, and then to beading so as to fasten a cover thereto by winding. The above-mentioned PET laminated plate was applied to the outer and inner surface of the barrel and cover of each of the thus obtained cans. The thus obtained PET laminated plate and the cans were subjected to various function tests. The results of the tests are shown in Table 1.

TABLE 1

| | Metal Plate | Adhesive | Coating Film Thickness | Laminating Condition | | Electron Radiation Irradiation Condition | | |
|---|---|---|---|---|---|---|---|---|
| | | | | Rolling Pressure (Kg/cm$^2$) | Rolling Temperature (°C.) | Voltage (KeV) | Current (mA) | Dose (Mrad) |
| Reference Example 5 | Tin Plate | A | 3$\mu$ | 5 | 180 | 270 | 50 | 4 |
| Reference Example 6 | Tin Plate | B | 2$\mu$ | 5 | 180 | 250 | 40 | 3 |
| Reference Example 7 | Tin Plate | C | 3$\mu$ | 5 | 180 | 250 | 40 | 5 |
| Reference*[1] Example 8 | Tin Plate | D | 4$\mu$ | 8 | 180 | 270 | 50 | 4 |
| Reference Example 9 | Aluminum*[2] Plate | A | 3$\mu$ | 5 | 180 | 270 | 50 | 4 |
| Comparison Example 1 | Tin Plate | Comparison-1 | 3$\mu$ | 5 | 180 | — | — | — |
| Comparison Example 2 | Tin Plate | Comparison-2 | 3$\mu$ | 5 | 180 | 270 | 50 | 4 |

| | Adhesion 180° Peel-Off (g/15 mm) | Processability Dupont Impact | Retort Resistance | | | External Appearance | Thermal Stability |
|---|---|---|---|---|---|---|---|
| | | | Whitening | Adhesion | Condition of Parting Line | | |
| Reference Example 5 | 500 | Satisfactory | Satisfactory | Satisfactory | Satisfactory | Satisfactory | Satisfactory |
| Reference Example 6 | 450 | Satisfactory | Satisfactory | Satisfactory | Satisfactory | Satisfactory | Satisfactory |
| Reference Example 7 | 600 | Satisfactory | Satisfactory | Satisfactory | Satisfactory | Satisfactory | Satisfactory |
| Reference*[1] Example 8 | 400 | Satisfactory | Satisfactory | Satisfactory | Satisfactory | Satisfactory | Satisfactory |
| Reference Example 9 | 500 | Satisfactory | Satisfactory | Satisfactory | Satisfactory | Satisfactory | Satisfactory |
| Comparison Example 1 | 300 | Satisfactory | Whitening | Satisfactory | Occurrence of Bilstering | Occurrence of Water-spot Pattern | Satisfactory |
| Comparison Example 2 | 400 | Satisfactory | Satisfactory | 30% Peel-off in Processed | Satisfactory | Satisfactory | Satisfactory |

TABLE 1-continued

Part

Notes to Table 1
[*1] A PET film used in Reference Example 5 and having one surface thereof which was subjected to multi-color printing, and then was coated thereover with the adhesive D, was used:
[*2] 5052 aluminum plate (manufactured by Kobe Steel Manufacturing Co.) having a thickness of 0.30 mm and subjected to chemical conversion treatment was used.

REFERENCE EXAMPLE 6 to 9

PET laminated metal plates and cans were obtained under conditions shown in Table 1, by a method similar to Reference Example 5. The results of the function tests are shown in Table 1.

The test methods used are as follows;
(1) Peel-off at 180 deg. C.: As stated in JIS K-6744;
(2) Dupont impact resistance test: the PET film surface is back-hit under conditions of ½ inch, 500 g load and 50 cm height, and then whether peel-off occurs between the metal plate and the PET film or not is observed;
(3) Retort Resistance: The PET laminated metal plate which formed into a bottom cover having a diameter of 200 mm for a beverage can is exposed to water vapor from the water supply at an autoclave pressure of 1.4 atm., and at a temperature of 125 deg. C. for 30 min, and the whitening condition and adhesion thereof are evaluated.

Further, a welded can made of the PET laminated metal plate and having a diameter of 200 mm is enclosed therein with water and is exposed to steam from the water supply at an autoclave temperature of 1.4 atm. at a temperature of 125 deg. C. for 30 min, and thereafter, the condition of a parting line on the outer surface of the can in the welded part and the general outer surface thereof are visually checked externally.

(4) Thermal Stability: The laminated plate is cut into a piece having a size of 5 cm×5 cm, and is then subjected to heat-treatment at a temperature of 200 deg. C. for 2 min. The thermal contraction of the PET film is observed.

COMPARISON EXAMPLE 1

A PET film and a metal plate are laminated with each other, similar to Reference Example 5, excepting that an adhesive (which will be hereinbelow denoted as "comparison-1") obtained by adding trilenediisocyanate blocked as a hardener to a composition composed of 300 weight parts of the polyester resin (I) solution obtained in Manufacture Example 1 and added thereto with 80 weight parts of silica is used, instead of the adhesive A used in Reference Example 5, and then the adhesive is heated at a temperature of 215 deg. C. for one minute so that the adhesive is completely cured in order to obtain a PET laminated metal plate and cans.

COMPARISON EXAMPLE 2

A PET laminated metal plate and cans are obtained similar to Reference Example 5, excepting that an adhesive having components which are substantially the same as those of the adhesive A used in Reference Example 5, but which exclude silica.

The results of function tests of the materials obtained in the above-mentioned comparison examples 1 and 2 are shown in Table 1.

REFERENCE EXAMPLE 10 TO 14 AND COMPARISON EXAMPLES 3 TO 5

With the use of cans obtained by a method similar to Reference Example 5 under conditions shown in Table 2, various hygienic tests were carried out. The results of the tests are shown in Table 2.

TABLE 2

|  | Metal Plate | Thickness of Adhesive | Laminating Condition | | | Electron Radiation Irradiation Condition | | |
|---|---|---|---|---|---|---|---|---|
|  |  |  | Speed (m/min) | Temperature (°C.) | Line Pressure (Kg/cm) | Voltage (KeV) | Current (mA) | Dose (Mrad) |
| Reference Example 10 | Tin Plate | A 3μ | 200 | 150 | 45 | 270 | 50 | 4 |
| Reference Example 11 | Tin Plate | B 2μ | 200 | 150 | 45 | 270 | 50 | 3 |
| Reference Example 12 | Tin Plate | C 3μ | 200 | 150 | 45 | 270 | 50 | 5 |
| Reference Example 13 | Tin Plate | D 4μ | 200 | 150 | 45 | 270 | 50 | 4 |
| Reference Example 14 | Tin Plate | A 3μ | 200 | 180 | 45 | 270 | 50 | 4 |
| Comparison Example 3 | Tin Plate | Comparison-1 3μ | 200 | 180 | 45 | — | — | — |
| Comparison Example 4 | Tin Plate | Comparison-1 3μ | 150 | 150 | 45 | — | — | — |
| Comparison Example 5 | Tin Plate | Comparison-1 3μ | 150 | 180 | 45 | — | — | — |

|  | External Appearance | Adhesion 180° Peel-Off (g/15 mm) | Process-ability | Hygienic Test | | Storage Test |
|---|---|---|---|---|---|---|
|  |  |  |  | RSV | KMnO$_4$ |  |
| Reference Example 10 | Satisfactory | 500 | ⊚ | 5.7 | 6.4 | ⊚ |
| Reference Example 11 | Satisfactory | 450 | ⊚ | 8.6 | 7.3 | ⊚ |
| Reference | Satisfactory | 600 | ⊚ |  |  | ⊚ |

TABLE 2-continued

| | | | | | | | |
|---|---|---|---|---|---|---|---|
| Example 12 Reference Example 13 | Satisfactory | 400 | ⊙ | | | | ⊙ |
| Reference Example 14 | Satisfactory | 600 | ⊙ | | | | ⊙ |
| Comparison Example 3 | Unevenness in Adhesion | — | — | — | — | | — |
| Comparison Example 4 | Slight Unevenness in Adhesion | 50 | X | — | — | | — |
| Comparison Example 5 | Satisfactory | 400 | ○ | 11.6 | 13.8 | | Δ |

The test method used is as follows:

(5) Processability: The delamination after retort treatment (at a temperature of 120 deg. C. for 30 min) is evaluated.
⊙ indicates a satisfactory condition while ○ indicates a condition such that slight releasing is found in the film, and x indicates a condition such that the film peels off from the base.

(6) Hygienic Test
(a) RSV (Residual Solvent volume): An empty can is flushed with $N_2$ and is then empty-rolled. Thereafter, the empty can is heated at a temperature of 150 deg. C. for 15 min, and then, 1 cc of sampling is made in order to perform gas-chromatograph spectrometry. Ethanol conversion is carried out as the density of ethanol of 1 μliter/1 liter (air) is set to 100.

(7) $KMnO_4$ Consumption: Under the food hygienic Law (7) Storage Test: The conditions of four kinds of foods, that is coffee, oolong tea, plum juice and vegetable juice, are tested after one month of storage at a temperature of 60 deg. C. ⊙ indicates a satisfactory condition while Δ indicates a condition in which corrosion is found underneath the PET film.

REFERENCE EXAMPLES 15 TO 16 AND COMPARISON EXAMPLES 6

Punched-out covers having a diameter of 200 mm are formed with the use of the PET laminated metal plates which have been produced under the conditions shown in Table 3, and then the processability, rolling ability and storage stability are tested. The results of the test are shown in Table 3.

a condition in which remarkable deposition is found.

(10) Storage Test: the same as (7).

A PET laminated metal plate obtained by the present invention is excellent in adhesion between a PET film and a metal plate, and is also excellent in retort resistance, in particular for a processed part. Surprisingly, irradiation of electron radiation through the PET film in order to completely cure the adhesive, causes the PET film itself to be reformed although the mechanism of this action has not yet been clear. Accordingly, it is possible to greatly reduce the conventional problems of occurrence, after retort processing, of whitening and blistering on a parting line in the barrel section in the vicinity of the weld of a can which is obtained by a conventional manufacturing method. Further, it is possible to exhibit remarkable advantages that no water spot-like pattern is exhibited on the surface of the PET film, and the luster of the PET film can be enhanced.

Further, the lamination of a PET film and a metal plate with the use of a polyester resin group electron radiation curing type adhesive, can be made at a high speed (200 m/min) and a low temperature of about 150 deg. C., and further, the time of complete curing of the adhesive can be greatly reduced since the adhesive can be cured by electron radiation. As a result, there is exhibited such merit that the factory space can be greatly reduced.

In addition, the temperature of lamination is not always limited to 150 deg. C. but it is can be set within a range which does not exceeds the melting point of the PET film.

Also, with the use of adhesive according to the present invention, it is possible to exhibit such a great effect that the environment of irradiation of electron radiation is not always limited to that under a nitrogen atmosphere, but the curing by electron radiation can be made in the atmosphere.

What is claimed is:

1. An electron radiation curing adhesive composition comprising 0.5 to 250 PHR of a stress relaxation agent, and a resin composition having 0.3 to 5.0 mol/kg mole-

TABLE 3

| | Metal Plate | Thickness of Adhesive | Laminating Condition | | | Electron Radiation Irradiation Condition | | | External Appearance | Processability | Rolling Ability | Storage Test |
|---|---|---|---|---|---|---|---|---|---|---|---|---|
| | | | Speed (m/min) | Temperature (°C.) | Line Pressure (Kg/cm) | Voltage (KeV) | Current (mA) | Dose (Mrad) | | | | |
| Reference Example 15 | Tin-Free Steel | A 3μ | 200 | 150 | 45 | 270 | 50 | 4 | Satisfactory | ⊙ | ⊙ | ⊙ |
| Reference Example 16 | Tin-Free Steel | B 2μ | 200 | 150 | 45 | 270 | 50 | 4 | Satisfactory | ⊙ | ⊙ | ⊙ |
| Comparison Example 6 | Tin-Free Steel | Comparison-1 3μ | 150 | 180 | 45 | — | — | — | Satisfactory | ○ | X | Δ |

The test methods used are as follows:

(8) processability: after punching of 200 mm diameter, it is exposed to $CuSO_4$ for 5 min. ⊙ indicates a satisfactory condition while ○ indicates a condition in which slight deposition of $CuSO_4$ is found.

(9) Rolling Ability: After rolling into a predetermined size, it is exposed to $CuSO_4$ for 5 min. ⊙ indicates a satisfactory condition while x indicates cule of polymeric unsaturated double-bonds, said resin composition containing 100 weight parts of a thermoplastic polyester resin having a number-average molecular weight of 7,000 to 40,000 blended with 2 to 200 weight parts of a polyester group oligomer having a number-average molecular weight of 300 to 5,000.

2. The composition according to claim 1 wherein the stress relaxation agent is a member selected from inorganic finely divided fillers.

3. The composition according to claim 2 wherein said filler is selected from the group consisting of silica, bentonite, clay, talc, barium sulfate and calcium carbonate.

4. The composition according to claim 1 wherein said stress relaxation agent has a particle size of 0.01 to 0.002 microns.

5. The composition according to claim 1 wherein 0.5 to 250 PHR, based on the resin composition composed of polyester resin and oligomer, of a finely divided inorganic filler is present.

6. The composition according to claim 5 wherein said polyester is a condensed and polymerized reaction product of a polybasic acid and a polyhydroxy alcohol.

7. The composition according to claim 5 wherein said oligomer is a polyester group oligomer formed from acrylic or methacrylic acid linked to a low molecular weight polyester containing less than 5000 number average molecular weight.

8. The composition according to claim 1 which additionally contains less than 30% by weight of a vinyl resin, vinylidene resin or polyisocyanate to enhance the retort resistance of said composition.

9. A polyester film laminated metal plate for cans comprising a polyester film laminated over at least one surface of a metal plate by an electron radiation curing adhesive in which 0.5 to 250 PHR of a stress relaxation agent is added to a resin composition having 0.3 to 5.0 mol/kg molecule of polymeric unsaturated double-bond, and containing 100 weight parts of a thermoplastic polyester resin having a number-average molecular weight of 7,000 to 40,000, and 2 to 200 weight parts of polyester group oligomer having a number-average molecular weight of 300 to 5,000.

* * * * *